United States Patent
Perone et al.

(10) Patent No.: US 11,509,794 B2
(45) Date of Patent: Nov. 22, 2022

(54) MACHINE-LEARNING COMMAND INTERACTION

(71) Applicant: Hewlett-Packard Development Company, L.P., Spring, TX (US)

(72) Inventors: Christian Perone, Porto Alegre (BR); Thomas Paula, Porto Alegre (BR); Roberto Pereira Silveira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 504 days.

(21) Appl. No.: 16/499,030

(22) PCT Filed: Apr. 25, 2017

(86) PCT No.: PCT/US2017/029253
§ 371 (c)(1),
(2) Date: Sep. 27, 2019

(87) PCT Pub. No.: WO2018/199913
PCT Pub. Date: Nov. 1, 2018

(65) Prior Publication Data
US 2021/0112178 A1    Apr. 15, 2021

(51) Int. Cl.
*H04N 1/327* (2006.01)
*G06F 40/30* (2020.01)

(52) U.S. Cl.
CPC ......... *H04N 1/32784* (2013.01); *G06F 40/30* (2020.01)

(58) Field of Classification Search
CPC .................................. H04N 1/32784
USPC ....................................................... 358/1.15
See application file for complete search history.

(56) References Cited

U.S. PATENT DOCUMENTS

| 5,377,303 | A | 12/1994 | Firman | |
|---|---|---|---|---|
| 6,665,640 | B1* | 12/2003 | Bennett | G10L 15/22 704/E15.04 |
| 9,451,088 | B2 | 9/2016 | Williams | |
| 2003/0065564 | A1* | 4/2003 | Carroll | G06Q 30/02 709/224 |
| 2009/0228264 | A1 | 9/2009 | Williams et al. | |
| 2012/0016678 | A1 | 1/2012 | Gruber et al. | |
| 2014/0255895 | A1 | 9/2014 | Shaffer et al. | |
| 2015/0154976 | A1* | 6/2015 | Mutagi | G06F 3/167 704/275 |
| 2016/0012818 | A1 | 1/2016 | Faizakof et al. | |

(Continued)

FOREIGN PATENT DOCUMENTS

| KR | 20040040163 | 5/2004 |
|---|---|---|
| WO | WO-2017053208 | 3/2017 |

OTHER PUBLICATIONS

Deloitte ~ The Disruptive Chat Beds Sizing Up Real Opportunities for Business, 2016,< https://www2.deloitte.com/content/dam/Deloitte/ ~ 6 pages.

(Continued)

*Primary Examiner* — Jacky X Zheng
(74) *Attorney, Agent, or Firm* — Jefferson IP Law, LLP

(57) ABSTRACT

Examples disclosed herein relate to receiving a query via a chat interaction, translating the received query into one of a set of predefined commands according to a trained machine-learning model, and providing a result of the one of the set of predefined commands to the chat interaction.

16 Claims, 3 Drawing Sheets

(56) References Cited

U.S. PATENT DOCUMENTS

2016/0162466 A1 6/2016 Munro et al.
2016/0259775 A1 9/2016 Gelfenbeyn et al.
2016/0357855 A1 12/2016 Fan et al.
2018/0068371 A1* 3/2018 Krishnamurthy .... G06N 3/0427

OTHER PUBLICATIONS

Iacpbacci. I., et al, Embeddings for Word Sense Disambiguation: an Evaluation Study, Aug. 7-12, 2016, http://www.aclweb.org/anthology/ ~ 11 pages.

* cited by examiner

MACHINE-LEARNING COMMAND INTERACTION

BACKGROUND

Multi-function devices are often used to print, copy, fax and/or scan documents, among other features. Such devices offer an array of available menu commands, options, and the ability to provide information to users.

BRIEF DESCRIPTION OF THE DRAWINGS

In the accompanying drawings, like numerals refer to like components or blocks. The following detailed description references the drawings, wherein.

DETAILED DESCRIPTION

Figure 1:
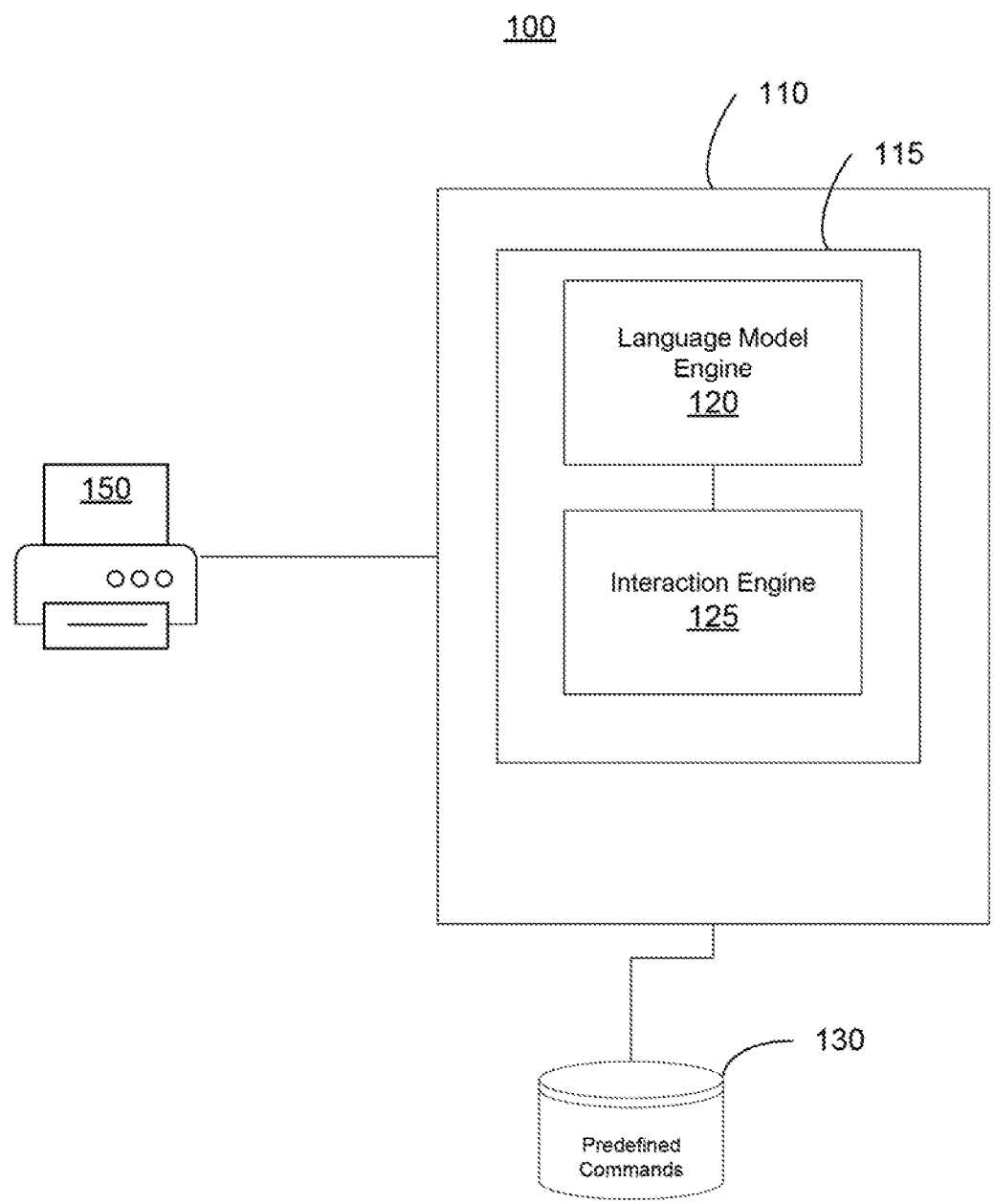
FIG. 1 is an example system for providing query interaction.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments.

Various electronic devices, such as printers, laptops, smartphones, and/or other computing devices often provide a user interface (UI) for interactions with a user. Such UIs may, for example, provide status information, accept commands and instructions, provide maintenance instructions, etc. There can, in some cases, be hundreds of commands that the device may be able to respond to, but the user often has little patience for typing and/or clicking through numerous menu levels to try and find the correct UI option to access the information they desire.

In examples herein, a natural language interface may be provided, such as an interactive chat interface. Sometimes referred to as a "chatbot", the interface may accept queries from a user, such as may be typed and/or spoken, translate the query into one of the predefined commands known by the device, and provide a response to the user. For example, a user may ask the chatbot "how much ink is left?" The chatbot may use a trained machine-learning model to translate the query "how much ink is left" into a feature vector that may then be used to identify a closest matching command, also extracted into a feature vector. The command may be executed on the device and the answer provided to the user as a response from the chatbot.

Feature vectors, which may include image and/or textual feature vectors, may represent properties of a textual representation. For example, a textual feature vector may represent similarity of words, linguistic regularities, contextual information based on trained words, description of shapes, regions, proximity to other vectors, etc. The feature vectors may be representable in a multimodal space. A multimodal space may include k-dimensional coordinate system. When the image and textual feature vectors are populated in the multimodal space, similar image features and textual features may be identified by comparing the distances of the feature vectors in the multimodal space to identify a matching image to the query. One example of a distance comparison may include a cosine proximity, where the cosine angles between feature vectors in the multimodal space are compared to determine closest feature vectors. Cosine similar features may be proximate in the multimodal space, and dissimilar feature vectors may be distal. Feature vectors may have k-dimensions, or coordinates in a multimodal space. Feature vectors with similar features are embedded close to each other in the multimodal space in vector models.

Feature-based vector representation may use various models, to represent words, images, and structures of a document in a continuous vector space. Different techniques may be applied to represent different features in the vector space, and different levels of features may be stored according to the number of documents that may need to be maintained. For example, semantically similar words may be mapped to nearby points by relying the fact that words that appear in the same contexts share semantic meaning. Two example approaches that leverage this principle comprise count-based models (e.g. Latent Semantic Analysis) and predictive models (e.g. neural probabilistic language models). Count-based models compute the statistics of how often some word co-occurs with its neighbor words in a large text corpus, and then map these count-statistics down to a small, dense vector for each word. Predictive methods directly try to predict a word from its neighbors in terms of learned small, dense embedding vectors (considered parameters of the model). Other layers may capture other features, such as font type distribution, layout, image content and positioning, color maps, etc.

In some examples, an index may be created with feature vectors and identifiers of a predefined command set understood by a printing device. In some implementations, similar command sets may be extracted for a plurality of different devices, and including may include extractions of identifiers for each device. Indexing may include storing an identifier (ID) of a command and its feature vector, and searches may return an identifier of the image. Each command may, for example, include required and/or optional parameters. For example, a command to identify an ink level may include an optional parameter to identify the ink level of a specific color's cartridge and/or of all installed cartridges. The list of commands may be manually selected and/or automatically populated, such as by scanning the appropriate function listings available in a device's application programming interface (API).

In some implementations, a machine-learning model may be trained on a large set of natural language documents, such as technical papers, news articles, fiction and/or non-fiction works, etc. The model may thus interpolate the semantic meanings and similarities of different words. For example, the model may learn that the words "Obama speaks to the media in Illinois" is semantically similar to the words "President greets the press in Chicago" by finding two similar news stories with those headlines. The machine-learning model may comprise, for example, a word2vec model trained with negative sampling. Word2vec is a computationally-efficient predictive model for learning word embeddings from raw text. It may rely on various models, such as the Continuous Bag-of-Words model (CBOW) and the Skip-Gram model. CBOW, for example predicts target words (e.g. 'mat') from source context words ('the cat sits on the'), while the skip-gram does the inverse and predicts source context-words from the target words. The machine learning model may also comprise of other types of vector representations for words, such as Global Vectors (GloVe)—, or any other form of word embeddings.

By extracting feature vectors from the set of predefined commands, each command may be made available to a wide variety of natural language queries by mapping a relatively small set of keywords to each of the set of predefined commands. Furthermore, the searching of the index of commands by vector representation takes considerably less time than conventional text string match searching. The natural language query of the user may, once extracted into a feature vector, be used to calculate a word mover distance (WMD) between the query and the commands. The WMD measures a dissimilarity between two text representation as the minimum amount of distance that the embedded words of one representation need to travel to reach the embedded words of another representation. The lower the WMD, the closer and/or more identical the words of each representation are.

FIG. 1 is a block diagram of an example system 100 for providing query interaction. System 100 may comprise a computing device 110 comprising a memory 115. Computing device 110 may comprise, for example, a general and/or special purpose computer, server, mainframe, desktop, laptop, tablet, smart phone, game console, printer and/or any other system capable of providing computing capability consistent with providing the implementations described herein. Computing device 110 may store, in memory 115, a language model engine 120 and an interaction engine 125.

Each of engines 120, 125 of system 100 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 120, 125. In such examples, system 100 may comprise the machine-readable storage medium storing the instructions and the processing resource to execute the instructions, or the machine-readable storage medium may be separate but accessible to system 100 and the processing resource.

Language model engine 120 may translate a received query into one of a set of predefined commands 130 according to a trained model. For example, the trained model may comprise a machine-learning model, such as a word2vec model trained on negative sampling on a plurality of natural language documents. In some implementations, translating the received query into one of the set of predefined commands 130 may comprise converting each word of the received query into a multi-dimensional vector representation. In some implementations, translating the received query into one of the set of predefined commands 130 may comprise calculating a word mover distance (WMD) between each word of the received query and each word of a catalog of words associated with the set of predefined commands 130.

In some examples, language model engine 120 may identify one of the set of predefined commands 130 comprising a lowest word distance with respect to the received query, based on the calculated WMD. Such commands, for example, may comprise commands associated with providing and receiving information from a printing device 150. For example, commands may include status inquiry commands about device 150 and/or a job being performed by device 150.

Received queries may be phrased in natural language, such as "how many pages have been printed today", "how many jobs are waiting", "how much ink is left" "when is the next service due", "what is your model", "what is your name", "what is your address", etc. These are merely given as examples, and multitudes of other queries may be received and mapped to the set of predefined commands 130. These example queries may be translated into commands from the set of predefined commands 130 by language model engine 120.

Language model engine 120 may, for example, comprise a convolutional neural network (CNN) that may translate both the set of predefined commands 130 and the received query into k-dimensional text feature vectors. The k-dimensional feature vectors may be vectors representable in a Euclidean space. The dimensions in the k-dimensional feature vectors may represent variables determined by the CNN describing the text of the query and the set of predefined commands 130. The k-dimensional feature vectors are representable in the same multimodal space, and can be compared using a distance comparison, such as a word mover distance (WMD) in the multimodal space. In various examples, language model engine 120 may comprise a convolution neural network-long short-term-memory (CNN-LSTM) encoder, a seq2seq (encoder-decoder model), and/or a structure neutral language model (SC-NLM) encoder. Some examples may use other models and/or a combination of models.

Interaction engine 125 may receive a query from a user, receive the predefined command from the language model engine, and provide a response to the query to the user according to the predefined command received from the language model engine. For example, the query may be a natural language sentence, a set of words, a phrase etc. The query may be received from a user by way of a chat-based interface, such as short message service, instant message, a web application, a voice interaction interface (with associated speech to text engine), etc.

Language model engine 120 may use a k-dimensional textual feature vector from the query to identify the closest matching command from the set of predefined commands 130. If no command is determined to be within a configurable threshold distance, then an error may be reported to the querying user. To perform the matching, language model engine 120 may compare the textual feature vector generated from the query to the textual feature vectors associated with the set of predefined commands 130.

Interaction engine 125 may execute the matching command, if any, on printing device 150. For example, printing device 150 may provide an API allowing an interaction engine 125 to execute a function with respect to printing device 150 and/or printing device 150 may accept remote execution commands, such as through a Simple Network Management Protocol (SNMP) query. Interaction engine 125 may provide the response to the command from the printing device 150 via the same interface the user used to submit the query. For example, the user may have typed the command "how many pages can I print?" into a chat interface. Language model engine 120 may translate the query into a command to the printing device 150 for a remaining ink level status check according to an available API for the printing device 150. Interaction engine 125 may then execute the API function and provide the response to the user's query via the chat interface.

In some implementations, system 100 may encompass the printing device 150; that is computing device 110 and memory 115 may be part of printing device 150 and set of predefined commands 130 may be stored in memory 115. Printing device 150 may provide the interface for receiving the query, such as via a network accessible application and/or via a hardware control panel's user interface. In other implementations, computing device 110 may be in communication with printer 150, such as a cloud service. Such implementations may allow language model engine 120 and interaction engine 125 to service a plurality of printing devices.

Although one computing device 110 is depicted in FIG. 1, certain implementations of system 100 may comprise more than one computing device 110. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

Figure 2:
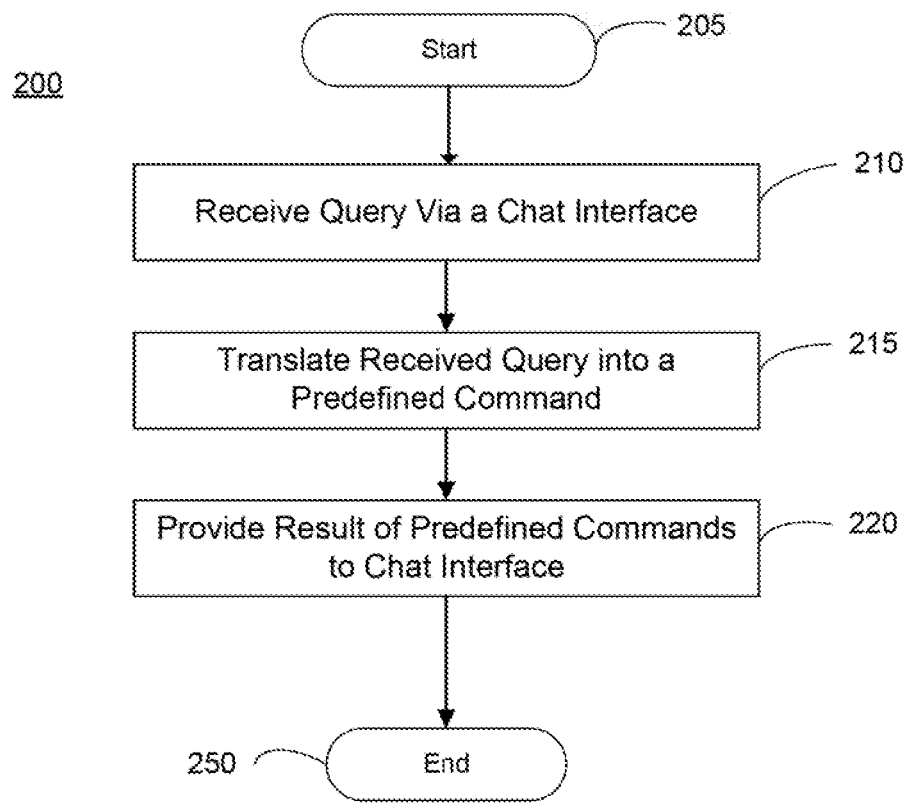
FIG. 2 is a flowchart of an example of a method for providing query interaction.

FIG. 2 is a flowchart of an example method 200 for providing query interaction. Although execution of method 200 is described below with reference to computing device 110, other suitable components for execution of method 200 may be used.

Method 200 may begin in stage 205 and proceed to stage 210 where computing device 110 may receive a query via a chat interaction. For example, the query may be a natural language sentence, a set of words, a phrase etc. The query may be received from a user by way of a chat-based interface, such as short message service, instant message, a web application, a voice interaction interface, etc. In examples herein, a natural language interface may be provided, such as an interactive chat interface. Sometimes referred to as a "chatbot", the interface may accept queries from a user, such as may be typed and/or spoken, translate the query into one of the predefined commands known by the device, and provide a response to the user. For example, a user may ask the chatbot "how much ink is left?" The chatbot may use a trained machine-learning model to translate the query "how much ink is left" into a feature vector that may then be used to identify a closest matching command, also extracted into a feature vector. The command may be executed on the device and the answer provided to the user as a response from the chatbot.

Method 200 may then advance to stage 215 where computing device 110 may translate the received query into one of a set of predefined commands according to a trained machine-learning model. In some implementations, the trained machine-learning model comprises a plurality of vector-represented word embeddings extracted from a plurality of natural language documents. For example, language model engine 120 may translate a received query into one of a set of predefined commands 130 according to a trained model. For example, the trained model may comprise a machine-learning model, such as a word2vec model trained on negative sampling on a plurality of natural language documents. In some implementations, translating the received query into one of the set of predefined commands 130 may comprise converting each word of the received query into a multi-dimensional vector representation. In some implementations, translating the received query into one of the set of predefined commands 130 may comprise calculating a word mover distance (WMD) between each word of the received query and each word of a catalog of words associated with the set of predefined commands 130.

The natural language query of the user may, once extracted into a feature vector, be used to calculate a word mover distance (WMD) between the query and the commands. The WMD measures a dissimilarity between two text representation as the minimum amount of distance that the embedded words of one representation need to travel to reach the embedded words of another representation. The lower the WMD, the closer and/or more identical the words of each representation are.

Language model engine 120 may use a k-dimensional textual feature vector from the query to identify the closest matching command from the set of predefined commands 130. If no command is determined to be within a configurable threshold distance, then an error may be reported to the querying user. To perform the matching, language model engine 120 may compare the textual feature vector generated from the query to the textual feature vectors associated with the set of predefined commands 130.

Method 200 may then advance to stage 220 where computing device 110 may provide a result of the one of the set of predefined commands to the chat interaction. Interaction engine 125 may execute the matching command, if any, on printing device 150. For example, printing device 150 may provide an API allowing an interaction engine 125 to execute a function with respect to printing device 150 and/or printing device 150 may accept remote execution commands, such as through a Simple Network Management Protocol (SNMP) query. Interaction engine 125 may provide the response to the command from the printing device 150 via the same interface the user used to submit the query. For example, the user may have typed the command "how many pages can I print?" into a chat interface. Language model engine 120 may translate the query into a command to the printing device 150 for a remaining ink level status check according to an available API for the printing device 150. Interaction engine 125 may then execute the API function and provide the response to the user's query via the chat interface.

Method 200 may then end at stage 250.

Figure 3:
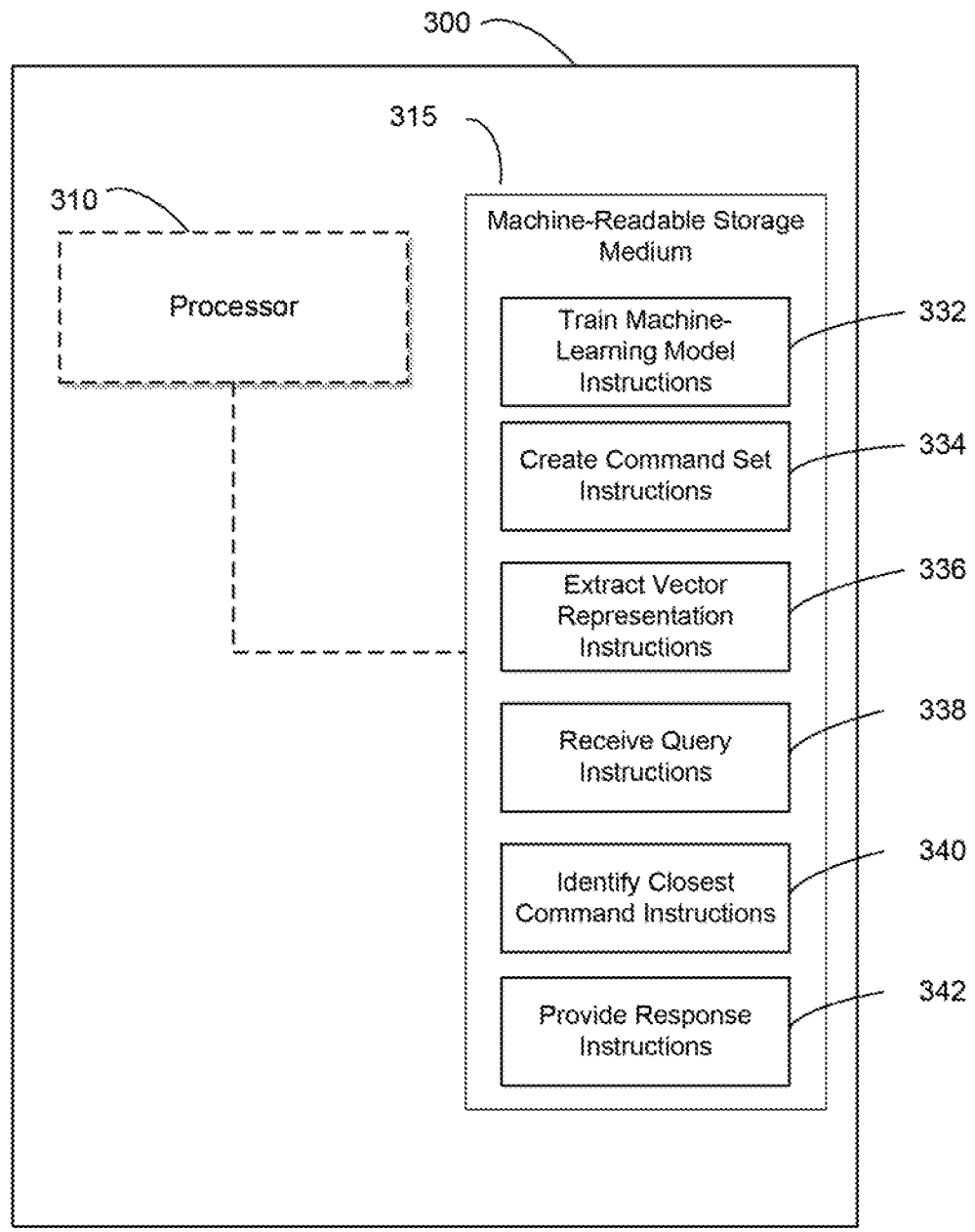
FIG. 3 is a block diagram of an example computing device for providing query interaction.

FIG. 3 is a block diagram of an example computing device 300 for providing query interaction. Computing device 300 may comprise a processor 310 and a memory 315 comprising a non-transitory, machine-readable storage medium. Memory 315 may comprise a plurality of processor-executable instructions, such as train machine-learning model instructions 332, create command set instructions 334, extract vector representation instructions 336, receive query instructions 338, identify closest command instructions 340, and provide response instructions 342. In some implementations, instructions 332, 334, 336, 338, 340, 342 may be associated with a single computing device 300 and/or may be communicatively coupled among different computing devices such as via a direct connection, bus, or network.

Processor 310 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 320. In particular, processor 310 may fetch, decode, and execute instructions 332, 334, 336, 338, 340, 342.

Executable instructions 332, 334, 336, 338, 340, 342 may comprise logic stored in any portion and/or component of machine-readable storage medium 315 and executable by processor 310. The machine-readable storage medium 315 may comprise both volatile and/or nonvolatile memory and data storage components. Volatile components are those that do not retain data values upon loss of power. Nonvolatile components are those that retain data upon a loss of power.

The machine-readable storage medium 315 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Train machine-learning model instructions 332 may train a machine-learning model comprising a plurality of vector-represented word embeddings extracted from a plurality of natural language documents. For example, language model engine 120 may comprise a convolutional neural network (CNN) that may translate both the set of predefined commands 130 and the received query into k-dimensional text feature vectors. The k-dimensional feature vectors may be vectors representable in a Euclidean space. The dimensions in the k-dimensional feature vectors may represent variables determined by the CNN describing the text of the query and the set of predefined commands 130. The k-dimensional feature vectors are representable in the same multimodal space, and can be compared using a distance comparison, such as a word mover distance (WMD) in the multimodal space. In various examples, language model engine 120 may comprise a convolution neural network-long short-term-memory (CNN-LSTM) encoder, a seq2seq (encoder-decoder model), and/or a structure neutral language model (SC-NLM) encoder. Some examples may use other models and/or a combination of models.

In some implementations, a machine-learning model may be trained on a large set of natural language documents, such as technical papers, news articles, fiction and/or non-fiction works, etc. The model may thus interpolate the semantic meanings and similarities of different words. For example, the model may learn that the words "Obama speaks to the media in Illinois" is semantically similar to the words "President greets the press in Chicago" by finding two similar news stories with those headlines. The machine-learning model may comprise, for example, a word2vec model trained with negative sampling. Word2vec is a computationally-efficient predictive model for learning word embeddings from raw text. It may rely on various models, such as the Continuous Bag-of-Words model (CBOW) and the Skip-Gram model. CBOW, for example predicts target words (e.g. 'mat') from source context words ('the cat sits on the'), while the skip-gram does the inverse and predicts source context-words from the target words.

Create command set instructions 334 may create a set of predefined commands associated with a printing device. In some examples, an index may be created with feature vectors and identifiers of a predefined command set understood by a printing device. In some implementations, similar command sets may be extracted for a plurality of different devices, and including may include extractions of identifiers for each device. Indexing may include storing an identifier (ID) of a command and its feature vector, and searches may return an identifier of the image. Each command may, for example, include required and/or optional parameters. For example, a command to identify an ink level may include an optional parameter to identify the ink level of a specific color's cartridge and/or of all installed cartridges. The list of commands may be manually selected and/or automatically populated, such as by scanning the appropriate function listings available in a device's application programming interface (API).

Extract vector representation instructions 336 may extract a vector representation of each of the set of predefined commands according to the machine-learning model. Feature-based vector extraction may use various models, to represent words, images, and structures of a document in a continuous vector space. Different techniques may be applied to represent different features in the vector space, and different levels of features may be stored according to the number of documents that may need to be maintained. For example, semantically similar words may be mapped to nearby points by relying the fact that words that appear in the same contexts share semantic meaning. Two example approaches that leverage this principle comprise count-based models (e.g. Latent Semantic Analysis) and predictive models (e.g. neural probabilistic language models). Count-based models compute the statistics of how often some word co-occurs with its neighbor words in a large text corpus, and then map these count-statistics down to a small, dense vector for each word. Predictive methods directly try to predict a word from its neighbors in terms of learned small, dense embedding vectors (considered parameters of the model). Other layers may capture other features, such as font type distribution, layout, image content and positioning, color maps, etc.

Receive query instructions 338 may receive a query from a user via a chat interface. For example, the query may be a natural language sentence, a set of words, a phrase etc. The query may be received from a user by way of a chat-based interface, such as short message service, instant message, a web application, etc. Received queries may be phrased in natural language, such as "how many pages have been printed today", "how many jobs are waiting", "how much ink is left", "when is the next service due", "what is your model", "what is your name", "what is your address", etc. These are merely given as examples, and multitudes of other queries may be received and mapped to the set of predefined commands 130. These example queries may be translated into commands from the set of predefined commands 130 by language model engine 120.

Identify closest command instructions 340 may identify a semantically closest one of the set of predefined commands to the received query according to the machine-learning model. For example, language model engine 120 may use a k-dimensional textual feature vector from the query to identify the closest matching command from the set of predefined commands 130. If no command is determined to be within a configurable threshold distance, then an error may be reported to the querying user. To perform the matching, language model engine 120 may compare the textual feature vector generated from the query to the textual feature vectors associated with the set of predefined commands 130. In some examples, language model engine 120 may identify one of the set of predefined commands 130 comprising a lowest word distance with respect to the received query, based on the calculated WMD. Such commands, for example, may comprise commands associated with providing and receiving information from a printing device 150. For example, commands may include status inquiry commands about device 150 and/or a job being performed by device 150.

Provide response instructions 342 may provide a response to the query according to the one of the set of predefined commands via the chat interface. For example, interaction engine 125 may execute the matching command, if any, on printing device 150. For example, printing device 150 may provide an API allowing an interaction engine 125 to execute a function with respect to printing device 150 and/or printing device 150 may accept remote execution commands, such as through a Simple Network Management Protocol (SNMP) query. Interaction engine 125 may provide the response to the command from the printing device 150 via the same interface the user used to submit the query. For example, the user may have typed the command "how many pages of ink are left" into a chat interface. Language model engine 120 may translate the query into a command to the printing device 150 for a remaining ink level status check according to an available API for the printing device 150. Interaction engine 125 may then execute the API function and provide the response to the user's query via the chat interface.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:

1. A system, comprising:
    a memory storing:
        a language model engine to:
            translate a received query into one of a set of predefined commands according to a trained model, the set of predefined commands populated based on a function listing via an application programming interface of the system; and
        an interaction engine to:
            receive the query from a user,
            receive the predefined command from the language model engine,
            execute the predefined command using the application programming interface of the system, and
            provide a response to the query to the user according to the execution of the predefined command received from the language model engine.

2. The system of claim 1, wherein the trained model comprises a machine-learning model trained on a plurality of natural language documents.

3. The system of claim 2, wherein the machine-learning model comprises a word embedding model.

4. The system of claim 1, wherein the interaction engine receives the query from the user via a chat interface.

5. The system of claim 1, wherein translating the received query into one of the set of predefined commands comprises converting each word of the received query into a multi-dimensional vector representation.

6. The system of claim 5, wherein translating the received query into one of the set of predefined commands further comprises calculating a word mover distance between each word of the received query and each word of a catalog of words associated with the set of predefined commands.

7. The system of claim 1, wherein translating the received query into one of the set of predefined commands further comprises identifying the one of the set of predefined commands comprising a lowest word distance with respect to the received query.

8. The system of claim 1, wherein the set of predefined commands comprise commands associated with a printing device.

9. The system of claim 8, wherein the system comprises the printing device.

10. The system of claim 8, wherein the interaction engine is in communication with the printing device.

11. A method comprising:
    receiving a query via a chat interaction of a device;
    translating the received query into one of a set of predefined commands according to a trained machine-learning model, the set of predefined commands populated based on a function listing via an application programming interface of the device;
    executing the one of the set of predefined commands using the application programming interface of the device; and
    providing a result of the execution of the one of the set of predefined commands to the chat interaction.

12. The method of claim 11, wherein the trained machine-learning model comprises a plurality of vector-represented word embeddings extracted from a plurality of natural language documents.

13. The method of claim 11, wherein translating the received query into one of the set of predefined commands comprises identifying a semantically closest command of the set of predefined commands to the received query.

14. The method of claim 13, wherein the device comprises a printing device.

15. A non-transitory machine readable medium storing instructions executable by a processor to:
    train a machine-learning model comprising a plurality of vector-represented word embeddings extracted from a plurality of natural language documents;
    create a set of predefined commands associated with a printing device, the set of predefined commands populated based on a function listing via an application programming interface of the printing device;

extract a vector representation of each of the set of predefined commands according to the machine-learning model;

receive a query from a user via a chat interface;

identify a semantically closest one of the set of predefined commands to the received query according to the machine-learning model;

execute the one of the set of predefined commands using the application programming interface of the printing device; and provide a response to the query according to the execution of the one of the set of predefined commands via the chat interface.

16. The non-transitory machine readable medium of claim 15, wherein the one of the set of predefined commands is translated into a Simple Network Management Protocol (SNMP) query and provided to the printing device.

* * * * *